UNITED STATES PATENT OFFICE.

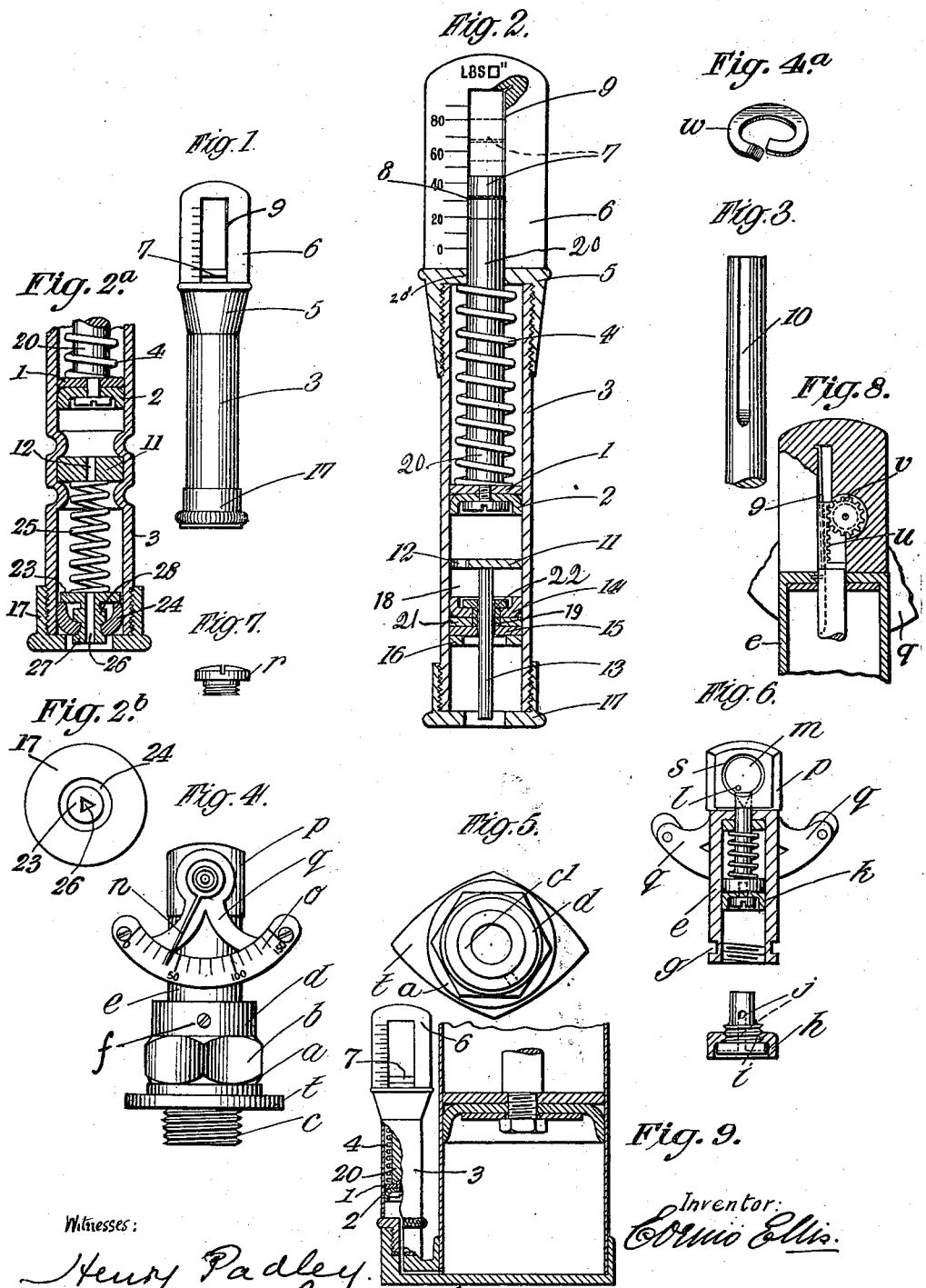

EVENIO ELLIS, OF SHEFFIELD, ENGLAND.

FLUID-PRESSURE GAGE.

1,275,180.   Specification of Letters Patent.   Patented Aug. 6, 1918.

Application filed July 24, 1915. Serial No. 41,785.

*To all whom it may concern:*

Be it known that I, EVENIO ELLIS, a subject of the King of Great Britain and Ireland, residing at 40 Harboard road, Woodseats, Sheffield, in the county of York, England, have invented a certain new and useful Improvement in Fluid-Pressure Gages, of which the following is a specification.

This invention relates to pressure gages of the kind wherein a spring-controlled piston is arranged to be actuated by the fluid pressure and works in a cylinder or pressure chamber. The invention is particularly intended for use upon inflaters for the pneumatic tires of motor-car and other vehicle wheels, or it may be used in a detached form for testing the pressure in pneumatic tires or the like; the invention is, however, not limited to these applications but may be employed for testing compression in internal-combuston engines and for testing or indicating steam and other fluid pressures generally.

The object of the invention is to produce a simple and reliable form of gage without parts liable to be readily damaged or put out of order. Its indicating-piece is arranged to be retained in any position to which it may be moved so that a reading can be taken at any time (until the gage is re-set) and either with or without disconnection of the instrument from the source of pressure whichever may be more convenient.

The gage according to this invention is characterized by the combination of a shell or cylinder provided with an end cap or closed end having an opening, a fixed scale-carrying part upon said cap or end, said part having one or more inside surfaces serving to hold and support a member, which constitutes a frictionally-retained indicating-piece or part of frictionally-retained indicator mechanism and is separate from, but actuated by, a piston-rod sliding directly in the opening in said cap or end, a piston working directly in said shell or cylinder, and a compression spring controlling the movement of said piston and piston-rod, said compression spring throughout its length being disposed directly and solely between the piston-rod and the shell or cylinder. The arrangement is such that the compression spring cannot at any time come into contact with the indicating-piece. In general the indicating-piece is of solid construction although for the purpose of reducing weight or for other considerations it may be made hollow.

Other features of the invention will be hereinafter referred to and pointed out in the appended claims.

Referring now to the accompanying drawings which show convenient forms of the invention:

Figures 1–3 show a portable form of gage suitable for testing the pressure in pneumatic tires or the like, Fig. 1 being a front elevation, Fig. 2 a part sectional elevation (on a much larger scale) the valve-releasing means shown being suitable for use with the English type of tire valve.

Fig. 2ª a sectional elevation of so much of a tester as is necessary to show the valve-releasing means when the instrument is to be used with the American type of tire valve.

Fig. 2ᵇ an underside view of Fig. 2ª.

Fig. 3 a view of a further detail hereinafter described.

Figs. 4–7 show a gage suitable for indicating the compression in the cylinder of internal-combustion engines and for similar purposes.

Fig. 4 being a front elevation,

Fig. 4ª a view of a suitable form of friction-spring,

Fig. 5 a plan of the base-piece or bottom portion.

Fig. 6 a part sectional elevation from the back of the top portion, and

Fig. 7 a view of a removable cap.

Fig. 8 is a part sectional elevation of a modified construction hereinafter referred to, and Fig. 9 shows a gage (constructed after the manner of the portable tester shown in Figs. 1–3) applied as a fixture to the lower end of the barrel of an air pump or inflater.

Referring first to Figs. 1–3; a piston 1 with cup leather 2 works directly in a cylinder 3 serving as the pressure chamber. The piston-rod 20 sliding directly in an opening 20′ in the cap or closed end 5 of the cylinder is surrounded by a compression spring 4 bearing at its ends upon the cap and the piston, the cap being furnished with a flat scale-piece 6 which, as shown, is in the form of an inverted U. The indicating-member comprises a disk or short cylindrical piece 7 which may be grooved or marked as at 8 to correspond with the marking on the scale-piece. The piece 7 may work frictionally in the scale-piece and be thus retained in whatever position it may be moved to, or the friction may be introduced by a wire spring 9 or the like arranged within one limb of the scale-piece to engage a groove in the indicating-piece, the upper end of the piston-rod being, if desired, grooved as shown at 10, Fig. 3, so that the wire shall not hinder its outward movement. When used, this wire will also serve to prevent rotation of the indicating-piece. A disk or diaphragm 11 perforated at 12 is securely fixed within the cylinder 3. According to the arrangement shown in Fig. 2 this disk 11 carries a valve-releasing pin 13 and on this pin are mounted a piston 21 and cup leather 14 (secured to the piston by a stud 22), a loose rubber or leather washer 15 fitting the cylinder and a loose metal ring 16. The ring serves to keep the flexible washer in position. With this construction, when the pin 13 releases the tire or like valve the washer 15 will rest upon or be very near the upper end of the valve stem. A little of the released air may escape into the outer atmosphere with negligible result; the bulk passes up into the space 18 (by way of the small clearance 19 about the pin) with the result that the thus increased pressure above the lower piston 21 forces this piston down so that the washer 15 beds tightly upon the end of the valve stem carried by the tire or the like. An air tight joint is in this way established, and thereafter, owing to the opening 12, the pressure above and below the diaphragm 11 will be the same and equal to the pressure in the tire or the like. Until the washer 15 beds tightly on the end of the valve stem air escapes into the outer atmosphere so that until this bedding occurs the pressure below the piston remains practically atmospheric; the air tight connection is, however, established practically immediately after the valve has been opened by the pin 13. The pressure in the instrument forces out the piston-rod 20 and indicating-piece 7 until the compression of the spring 4 balances this pressure. It will be noticed that the parts 14, 15, 16 arranged upon the pin 13 in the manner shown will always bed upon the end of the valve stem or body whatever may be the length of such stem or of the valve pin used therein and will thus always form an air-tight joint therewith. The caps 5, 17, may be screwed upon, or rigidly fixed to, the cylinder 3; but when screwed they can be quickly removed to permit of the inspection and replacement of any of the parts of the gage. If desired, the cap 5 may be fixed upon or made integral with the cylinder 3 and the cap 17 screwed into position, and if then the disk 11 be detachably secured within the cylinder the construction will admit of all the parts being assembled or removed from one end of the cylinder; or after the parts above the disk 11 have been assembled this disk may be permanently secured in the cylinder. According to the arrangement shown in Figs. 2$^a$ and 2$^b$ the disk or diaphragm 11 is perforated at 12 and serves as an abutment for a small compression spring 25 which bears at its lower end upon a piston 23 fitted with a cup leather 24. This cup leather is mounted between the collars 27, 28 of a depending stud-like portion of the piston, a perforation 26 through the piston being provided for the purpose of allowing air to pass into the tester when it is applied to the valve of the tire. It will be observed that these forms of tire tester are particularly neat and simple and at the same time have no parts which are likely readily to get out of order or to be easily damaged. In their usual dimensions these gages are of short overall length and as the length does not vary when in use the spokes of a wheel or other obstructions will not interfere with the outward movement of the indicating-piece.

Referring now to Figs. 4–7 of the drawings, a base-piece $a$ has nut surfaces $b$ and a lower reduced and externally screw-threaded portion $c$ forming at its upper end a flange $c'$, Fig. 5, within the cylindrical part $d$. This base-piece is connected with a pressure chamber or cylinder $e$ by the engagement of a screw $f$ with a groove $g$. Fig. 6 shows an end cup leather $h$ and stud $i$ unscrewed and detached from the lower extremity of the cylinder $e$. This cup leather fits the cylindrical part $d$ of the base-piece $a$ and serves to prevent escape of fluid through the space between the base-piece and the lower end of the cylinder $e$. The fitting of a base-piece in this manner provides the advantage that after the device has been screwed into place the gage proper can be turned to any convenient position to facilitate reading. The stud $i$ is perforated as shown at $j$ to allow the fluid to pass up to below a cup leather $k$ on a spring-controlled piston and piston-rod similar to the corresponding parts of Figs. 1–3. The upper end of the piston-rod, however, is arranged to engage a crank-pin $l$ on a disk $m$ carrying a pointer or indicating-piece $n$ moving over a flat dial or scale $o$ which is fixed to the front of a head-piece $p$ on the top of the cylinder by means of a bracket $q$. The boss of the pointer is carried on a reduced or central pin portion of the disk in such a way that it is a little distance in front of the bracket $q$, and in the space between the boss and the bracket is disposed a helical spring $w$ (such as shown for example on an enlarged scale in Fig. 4$^a$) which is coiled around the pin portion and arranged to bear frictionally at its ends upon the bracket and boss respectively. This spring serves as a frictional means for retaining the pointer in any position to which it may be moved. The cap $r$, Fig. 7, normally closes the opening $s$ in the back of the head-piece $p$. The gage, as shown, is intended to be screwed into a cylinder, a leather washer $t$ being provided. Instead of employing a crank pin, rack-and-pinion gearing may be used; in this case as shown in Fig. 8 the rack $u$ would be formed separately from the piston-rod and would actuate a pinion $v$ on the spindle of the indicating arm, either the rack being held frictionally, as shown, after the manner of the piece 7, Fig. 2, or the indicating-arm provided with frictional retaining-means after the manner of that employed in Figs. 4–7. It will be seen that this gage is neat and simple and at the same time its parts can be readily examined and replaced when necessary. Its overall length is small and the movement of its indicating-piece will not be interrupted by any overhanging parts of the engine or other obstructions.

A gage according to this invention and intended for use with pneumatic tires or the like may be mounted on an air-pump in any suitable position, such as near the foot, as shown in Fig. 9. It will be seen that when a fixture on a pump the gage may be constructed without the diaphragm 11, Fig. 2 or Fig. 2ª, and the valve-releasing means.

All the gages can be quickly reset by hand and it is of course obvious that a tire tester as shown in Figs. 1–3 may have indicating means such as shown in Figs. 4–8 and the gage, Figs. 4–7, may have indicating-means such as shown in Figs. 1–3.

I am aware that in fluid-pressure gages employing a spring-controlled piston arranged to be actuated by the fluid-pressure it is known to provide an indicating-member separate from said piston and adapted to be retained in its various positions by friction. I am also aware that in a piston pressure gage attached to the valve of a wheel tire but not provided with a maximum indicator it is known to fit a shell with a perforated end cap carrying a scale formed upon a window, the piston-rod being arranged to slide directly in the opening in the cap and the piston arranged to work directly in the shell under the control of a compression spring disposed throughout its length directly and solely between the piston-rod and the shell. I do not claim either of such constructions broadly, but what I claim is:

1. In fluid-pressure gages, the combination of a shell or cylinder provided with an end cap or closed end having an opening, a fixed scale-carrying part upon said cap or end, said part having one or more inside surfaces serving to hold and support a member, which constitutes a frictionally-retained indicating-piece or part of frictionally-retained indicator mechanism and is separate from, but actuated by, a piston-rod sliding directly in the opening in said cap or end, a piston working directly in said shell or cylinder, and a compression spring controlling the movement of said piston and piston-rod, said compression spring throughout its length being disposed directly and solely between the piston-rod and the shell or cylinder.

2. In fluid-pressure gages, the combination of a shell or cylinder provided with an end cap or closed end having an opening, a fixed scale-carrying part upon said cap or end, said part having inside friction surfaces serving to hold and support a short cylindrical frictionally-retained indicating-piece which is separate from, but actuated by, a piston-rod sliding directly in the opening in said cap or end, a piston working directly in said shell or cylinder, and a compression spring controlling the movement of said piston and piston-rod, said compression spring throughout its length being disposed directly and solely between the piston-rod and the shell or cylinder.

3. In fluid-pressure gages, the combination of a shell or cylinder provided with an end cap or closed end having an opening, a fixed scale-carrying part upon said cap or end, said part having one or more inside surfaces which serve to hold and support a member which constitutes either a frictionally-retained indicating-piece or part of frictionally-retained indicator mechanism and is separate from, but actuated by, a piston-rod sliding directly in the opening in said cap or end, a piston working directly in said shell or cylinder, a compression spring controlling the movement of said piston and piston-rod, said compression spring throughout its length being directly and solely between the piston-rod and the shell or cylinder, and spring means for the purpose of effecting, or assisting in effecting, the frictional retention of said indicating-piece or said indicator mechanism in its various positions.

4. In fluid-pressure gages, the combination of a shell or cylinder provided with an end cap or closed end having an opening, a fixed scale-carrying part upon said cap or end, said part having one or more inside surfaces which serve to hold and support a member which constitutes either a frictionally-retained indicating-piece or part of frictionally-retained indicator mechanism and is separate from, but actuated by, a piston rod sliding directly in the opening in said cap or end, a piston working directly in said shell or cylinder, a compression spring controlling the movement of said piston and piston-rod, said compression spring throughout its length being directly and solely between the piston-rod and the shell or cylinder, and spring means between the indicating-piece and said part upon said cap or end, said indicating-piece being capable of moving relatively to said spring means provided for the purpose of effecting, or assisting in effecting the frictional retention of said indicating-piece or said indicator mechanism in its various positions.

5. In fluid-pressure gages, the combination of a shell or cylinder provided with an end cap or closed end having an opening, a part upon said cap or end carrying a flat scale, said part having one or more inside surfaces serving to hold and support a member which constitutes a solid frictionally-retained indicating-piece or part of frictionally-retained indicator mechanism, including a solid indicating-piece, and is separate from, but actuated by, a piston-rod sliding directly in the opening in said cap or end, a piston working directly in said shell or cylinder, and a compression spring controlling the movement of said piston and piston-rod, said compression spring throughout its length being disposed directly and solely between the piston-rod and the shell or cylinder.

In testimony whereof I affix my signature in the presence of two subscribing witnesses.

EVENIO ELLIS.

Witnesses:
H. PADLEY,
W. E. PICKFORD.